Feb. 27, 1968 P. STRANKS 3,370,652
CONTROL SYSTEM FOR VARYING THE PITCH OF PROPELLERS
Filed May 31, 1966
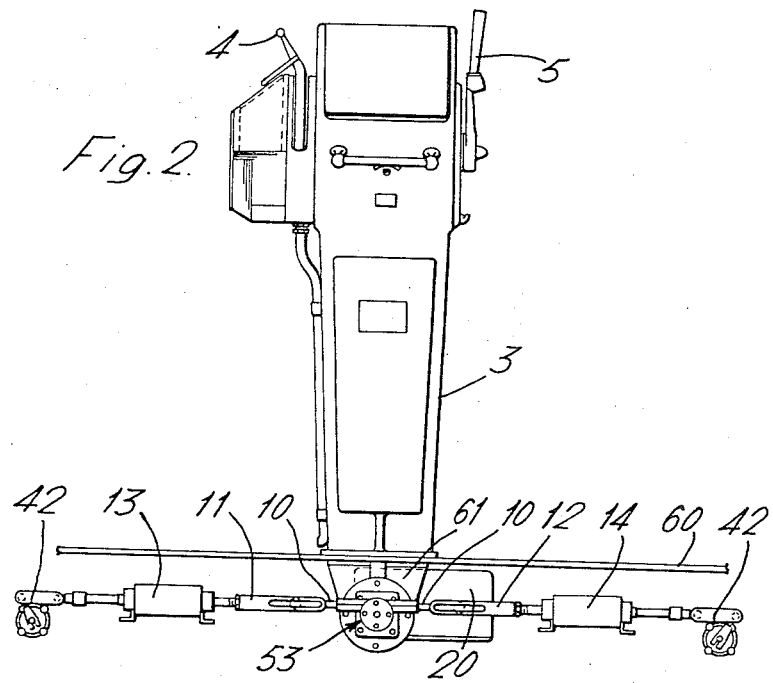
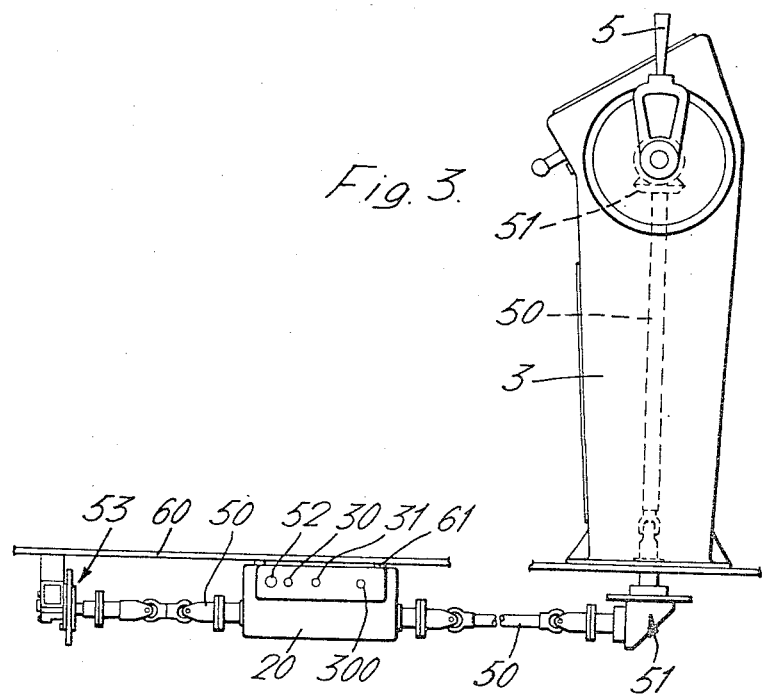
Inventor:
PERCY STRANKS
Attorney 3,370,652
CONTROL SYSTEM FOR VARYING THE
PITCH OF PROPELLERS
Percy Stranks, Aylesbury, England, assignor to
Bloctube Controls Limited, Aylesbury, England,
a British company
Filed May 31, 1966, Ser. No. 559,647
Claims priority, application Great Britain, June 4, 1965,
23,990/65
4 Claims. (Cl. 170—135.72)

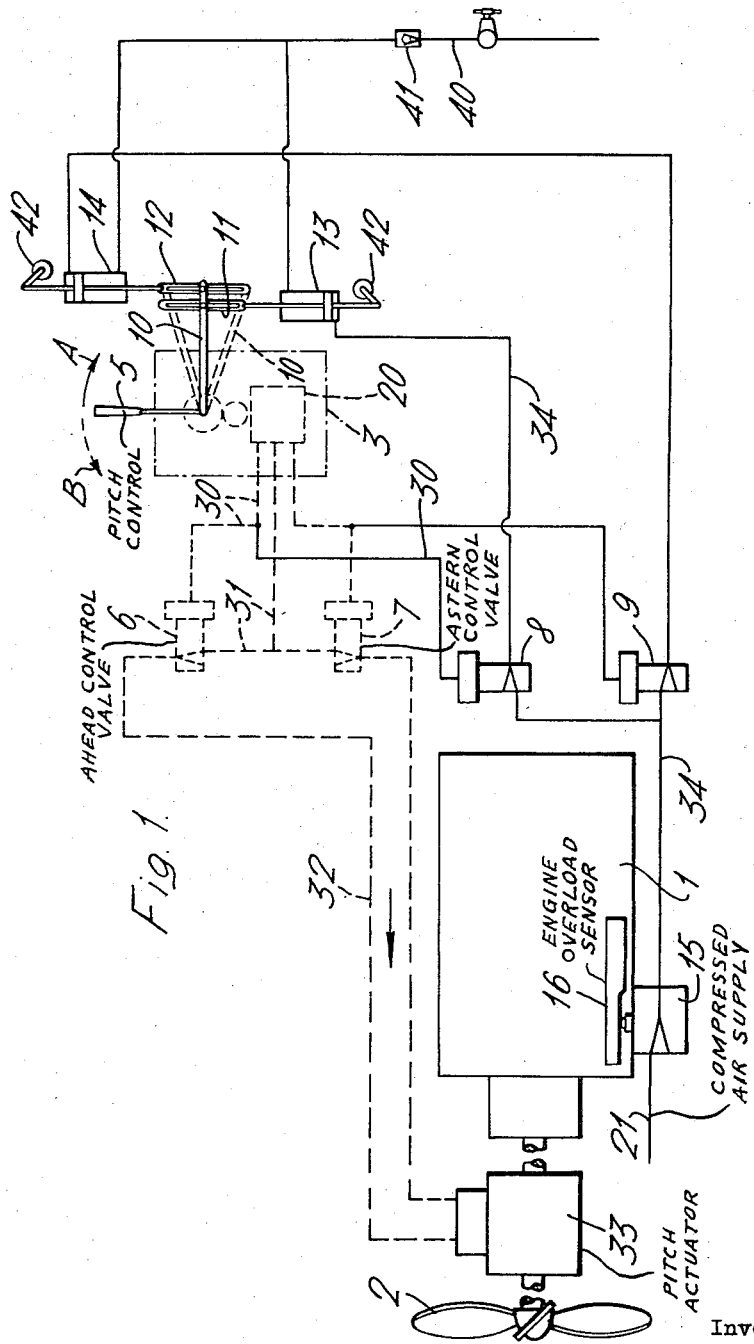

ABSTRACT OF THE DISCLOSURE

An engine load responsive control system for varying the pitch of marine propellers including a manually settable pitch control lever, a piston and cylinder unit energized by a load responsive member connected to the engine, a linkage operated by the piston of said unit and slidably connected to the lever to set back the same into a new position towards a zero pitch position thus reducing the pitch of the propeller, said linkage, as long as the overload conditions prevail, prevents the lever from being manually moved from its new position in a direction of increasing pitch, but allows the lever to be manually displaced from its new position in a direction of decreasing pitch.

---

This invention relates to remote control apparatus, especially remote control apparatus such as is installed in a marine vessel fitted with a variable pitch propeller and including two control levers, one lever being used to control the speed of the engine of the vessel and the other lever being used to control propeller pitch. With such apparatus as at present in use it is possible to set propeller pitch so that the engine is made to take a load greater than that for which it has been set or rated. This results in increased fuel consumption and accelerated wear in the engine and other parts.

The present invention has for its object to provide means whereby such overloading of the engine can be counteracted and reduced to a minimum, and to this end according to this invention in its broadest aspect there is provided remote control apparatus as above referred to which also includes means adapted automatically to cause resetting of the propeller pitch should overloading of the engine occur and thereby to counteract such overloading.

Remote control apparatus in accordance with one embodiment of this invention will now be described in some detail with reference to the accompanying drawings, this embodiment finding application in a pneumatically operated installation in a marine vessel. In the drawing:

FIGURE 1 is a diagrammatic illustration of the installation as a whole, and

FIGURES 2 and 3 are a front elevation and a side elevation respectively of the control pedestal and parts adjacent thereto as included in the installation.

The installation will first be described in general and simple terms with reference to FIGURE 1.

The installation comprises, in the usual way, a prime mover such as a diesel engine 1 which, of course, serves to impart drive to a variable pitch propeller 2, a control pedestal 3, and an interposed pneumatic control system which will be referred to in detail hereinafter. The engine 1 would be installed in the engine room of the vessel while the control pedestal 3 would be disposed at a point remote from the engine, that is on the bridge of the vessel. The control pedestal 3 incorporates separate levers 4 (see FIGURE 2) and 5 for controlling engine speed and propeller pitch respectively.

Operation of the propeller pitch control lever 5 for movement ahead or movement astern operates an ahead pitch valve 6 or an astern pitch valve 7 respectively, as a result of which the pitch of the propeller 2 will be appropriately varied. Operation of the propeller pitch control lever 5 for movement ahead by movement astern also operates an ahead relay valve 8 or an astern relay valve 9 respectively, the purpose of these last two valves and the operation of the ahead and astern pitch valves 6 and 7 being referred to in more detail hereinafter.

The propeller pitch control lever 5 has associated therewith, that is it moves together with, a member 10 which slidably engages in slots in an ahead link 11 and an astern link 12 which are connected to the piston rods of two oppositely acting ahead and astern piston and cylinder units 13 and 14 respectively. The pistons of these units are normally in positions in which the slotted links 11 and 12 will allow maximum free movement of the propeller pitch control lever 5, or, to be precise, of the member 10 associated therewith.

The cylinders of the piston and cylinder units 13 and 14 are connected respectively one to each of the aforesaid relay valves 8 and 9, both of the latter being connected to a three way poppet valve 15 disposed adjacent to and adapted to be operated by a cam face 17 of a load responsive member 16 of the engine 1. The member 16 is set to operate the poppet valve 15 when the load on the engine increases beyond that set for it at given engine speeds.

Compressed air for the pneumatic control system is conveniently derived from an existing supply, that is the compressed air system on the vessel.

Admission of air to the pitch valves 6 and 7 and the relay valves 8 and 9 is controlled by a cam unit 20 which is actually operated by movement of the propeller pitch control lever 5. The poppet valve 15 is also connected into the existing compressed air supply or system, a line thereof being indicated by the reference numeral 21.

Let us now assume, for the purposes of illustration, that it is desired to move the vessel ahead at full speed. The propeller pitch control lever 5 and the engine speed lever 4 are both moved appropriately, the former in the direction of the arrow "A" into an extreme, or maximum position corresponding to a maximum ahead pitch. Compressed air is first admitted through the cam unit 20 into line 30 leading to the ahead pitch valve 6 which will be opened. Then compressed air is admitted through line 31, through the now open valve 6 and so through line 32 to the propeller pitch control unit 33 so that the pitch of the propeller will be appropriately varied. It will be understood that the greater the movement of the propeller pitch control lever 5 the greater will be the pressure of air passed to the propeller pitch control unit 33.

At the same time as compressed air is admitted to the ahead pitch valve 6 it is admitted through a branch of line 30 to the ahead relay valve 8 which is thereby operated to open a line 34 between the poppet valve 15 and the cylinder of the piston and cylinder unit 13, that is the unit towards which the member 10 will have been moved. No air will pass to the cylinder, however, because the poppet valve 15 is still closed, that is it prevents admission of air to the ahead relay valve 8. The line 34 is in fact open to the atmosphere through the poppet valve 15.

Should an overload condition arise, and the possible causes of this are many, the poppet valve 15 will be operated by the load responsive member 16 of the engine 1 to admit compressed air from the line 21 to the line 34, through the ahead relay valve 8, to the cylinder of the ahead piston and cylinder unit 13. The piston of the latter is forced back thus also moving back the member 10 towards its rest or neutral position. The pitch control lever 5 is therefore also moved back from its maximum position into an intermediate position and the propeller pitch is thus automatically reduced or varied until the overload condition no longer exists. The poppet valve 15 will then be operated again by the load responsive member 16 to open the line 34 to the atmosphere. The piston of the piston and cylinder unit 13 can then return to its initial position. How this is actually achieved is explained hereinafter.

What happens when it is desired to move the vessel astern will be readily apparent and will not be described in detail. The propeller pitch control lever 5 will be moved in the direction of the arrow "B," and the astern pitch valve 7, the astern relay valve 9 and the piston and cylinder unit 14, with their corresponding interconnecting lines will be brought into operation.

An overload condition may occur at any speed or propeller pitch so that there may well be a lost movement between link 11 or 12 and member 10.

To sum up the operation, movement of the propeller pitch control lever for movement ahead (astern) operates the ahead (astern) pitch valve and the ahead (astern) relay valve. When an overload condition arises the propeller pitch control lever is automatically moved back into an intermediate position towards its neutral position until the overload condition no longer exists. By virtue of the sliding connections between member 10 on the one hand and links 11, 12 on the other hand, the lever 5 may be manually moved from the intermediate position further towards the neutral position, while a manual displacement from the intermediate position towards the opposite direction is resisted by the same link.

Instead of the poppet valve 15 a microswitch adapted to control a solenoid valve could be employed. It could be said that in FIGURE 1 both alternatives are diagrammatically illustrated.

To cushion the operative movements and to effect the return strokes of the pistons of the piston and cylinder units 13 and 14, the cylinders thereof are communicated, on the sides of the pistons opposite to the lines from the relay valves 8 and 9, with a line 40 from the existing compressed air system, a pressure reducing valve 41 being interposed thereon. To control the operative movement of the pistons hydraulic dashpot units 42 are operatively connected thereto.

FIGURES 2 and 3 show the control pedestal 3 and parts adjacent thereto, that is parts as referred to in connection with FIGURE 1.

The propeller pitch control lever 5 controls movement of shafting 50, with appropriately interposed bevel gearing 51 (see FIGURE 3). The shafting 50 passes into and through the cam box 20. Details of the cams within the box will not be described as this is not considered really necessary. The compressed air supply inlet is indicated by the reference numeral 52. The ends of lines 30 and 31, and also of line 300 to the astern pitch and relay valves are also shown.

The shafting 50 passes through the cam box 20 and on the end member of the shafting there is mounted the pinion of a rack and pinion unit 53. The rack of this unit actually constitutes the member 10, and the opposite ends thereof engage in slots of co-extending links 11 and 12 which are connected to the piston rods of piston and cylinder units 13 and 14 disposed on opposite sides of the rack and pinion unit 53. The pistons of these units are also connected to the hydraulic dashpot units 42.

The control pedestal 3 would be mounted on the decking 60 of the bridge of the vessel with the other parts appropriately supported, for example beneath the decking, by brackets 61. The invention is readily adaptable to existing differently arranged installations.

I claim:

1. In a control system for varying the pitch of a propeller driven by an engine, the improvement comprising, (A) a manually and automatically displaceable pitch control lever,
(B) means interconnecting said lever and said propeller for varying the pitch thereof as said lever is displaced,
(C) automatic pitch control means including
  (1) load responsive means actuated in response to the load on said engine,
  (2) lever actuating means energized by said load responsive means when said engine is overloaded, said lever actuating means including linkage means connected to said pitch control lever, said lever actuating means, when de-energized, allowing said pitch controller to be manually set into a maximum position corresponding to a maximum pitch, said lever actuating means, when energized by said load responsive means causing said pitch control lever to be displaced by said linkage means from said maximum position into an intermediate position corresponding to a reduced pitch, said linkage means allowing said pitch control lever to be manually displaced from said intermediate position to further decrease said reduced pitch, said linkage means resisting a manual displacement of said pitch control lever from said intermediate position to increase said reduced pitch as long as said lever actuating means is so energized.

2. A system as defined in claim 1, wherein said lever actuating means includes,
  (A) hydraulic conduit means carrying fluid under pressure,
  (B) valve means disposed in said conduit means and adapted to be energized by said load responsive means,
  (C) hydraulic cylinder means connected to said conduit means, said cylinder means including piston means adapted to be displaced when said valve means is energized, said linkage means including
    (1) a link affixed to said piston means, and
    (2) a member connected to said lever at one end and slidably connected to said link at the other end, said link, as long as said valve means is de-energized, adapted to allow said lever to be manually set into said maximum position, said link, when said valve means is energized, adapted to displace said lever by said member from said maximum position into said intermediate position.

3. A system as defined in claim 2, wherein said valve means includes an ahead relay valve and an astern relay valve, said hydraulic cylinder means includes an ahead cylinder associated with an ahead piston and an astern cylinder associated with an astern piston, said linkage means includes an ahead link affixed to said ahead piston and an astern link affixed to said astern piston, the said member of said linkage means slidably connected to both said ahead link and said astern link, said ahead relay valve, said ahead cylinder, said ahead piston and said ahead link operable when said lever is manually set for an ahead pitch, said astern relay valve, said astern cylinder, said astern piston and said astern link operable when said lever is manually set for an astern pitch.

4. A system as defined in claim 1, wherein said load responsive means causes displacement of said lever in proportion to the change of said load on said engine.

References Cited

UNITED STATES PATENTS 2,478,796   8/1949   Willi _____ 170—135.74
3,110,348   11/1963  Greines _____ 170—135.74

JULIUS E. WEST, *Primary Examiner.*